(12) United States Patent
Rudmann et al.

(10) Patent No.: US 11,867,968 B2
(45) Date of Patent: Jan. 9, 2024

(54) WAFER-LEVEL MANUFACTURE OF MICRO-DEVICES AND RELATED TWO-PIECE DEVICES, IN PARTICULAR MICRO-OPTICAL SYSTEMS

(71) Applicant: ams Sensors Singapore Pte. Ltd., Singapore (SG)

(72) Inventors: Hartmut Rudmann, Jona (CH); Alexander Bietsch, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 157 days.

(21) Appl. No.: 16/646,707

(22) PCT Filed: Aug. 16, 2018

(86) PCT No.: PCT/SG2018/050416
§ 371 (c)(1),
(2) Date: Mar. 12, 2020

(87) PCT Pub. No.: WO2019/054940
PCT Pub. Date: Mar. 21, 2019

(65) Prior Publication Data
US 2020/0271886 A1    Aug. 27, 2020

Related U.S. Application Data

(60) Provisional application No. 62/557,317, filed on Sep. 12, 2017.

(51) Int. Cl.
*G02B 9/04* (2006.01)
*G02B 7/02* (2021.01)

(52) U.S. Cl.
CPC .............. *G02B 7/025* (2013.01); *G02B 7/021* (2013.01)

(58) Field of Classification Search
CPC ... B29D 11/00307; B32B 17/06; B32B 37/12; G02B 7/025; G02B 7/021; G02B 13/0085
(Continued)

(56) References Cited

U.S. PATENT DOCUMENTS

2009/0159200 A1   6/2009   Rossi et al.
2010/0073532 A1   3/2010   Yano et al.
(Continued)

FOREIGN PATENT DOCUMENTS

| CN | 101945753 A | 1/2011 | |
| CN | 103033901 A | 4/2013 | |
| WO | WO-2014092148 A1 * | 6/2014 | ....... B29D 11/00298 |

OTHER PUBLICATIONS

International Preliminary Report on Patentability for Application No. PCT/SG2018/050416 dated Mar. 17, 2020 (6 pages).
(Continued)

*Primary Examiner* — Mahidere S Sahle
(74) *Attorney, Agent, or Firm* — Michael Best & Friedrich LLP (57) ABSTRACT

The device (10) comprises a first member (1) and a second member (2) which are stacked upon each other in a direction vertical direction. The first and second members comprise a central portion (C1; C2) each, and the first member (1) comprises at least a first distancing element (4) abutting the second member (2). The device (10) comprises a gap zone (G) and a bonding material (3), wherein the gap zone is peripheral to the central portions (C1; C2), and in the gap zone (G), a gap (5) is present between the first and second members. A portion of the gap (5) is filled by the bonding material (3) bonding the first and second members to each other in a bonding zone (B) comprised in the gap zone. A height (h) of the gap (5) is defined by the first distancing element (4).

18 Claims, 2 Drawing Sheets

(58) Field of Classification Search
USPC .......... 257/E21.499; 359/503, 601, 793, 811
See application file for complete search history.

(56) References Cited

U.S. PATENT DOCUMENTS

| | | |
|---|---|---|
| 2010/0079635 A1 | 3/2010 | Yano et al. |
| 2012/0200946 A1* | 8/2012 | Wippermann ......... G02B 7/028 156/99 |
| 2015/0115413 A1* | 4/2015 | Rudmann ......... H01L 27/14634 257/622 |
| 2017/0038552 A1 | 2/2017 | Georgiev |

OTHER PUBLICATIONS

International Search Report for corresponding International Application No. PCT/SG2018/050416 dated Aug. 16, 2018.
European Patent Office Extended Search Report for Application No. 18855655.9 dated May 18, 2021 (8 pages).
Office Action isseud from the Chinese Patent Office for related Application No. 201880072970.9 dated Feb. 22, 2022 (7 Pages including Statement of Relevance).

* cited by examiner

WAFER-LEVEL MANUFACTURE OF MICRO-DEVICES AND RELATED TWO-PIECE DEVICES, IN PARTICULAR MICRO-OPTICAL SYSTEMS

CROSS REFERENCE TO RELATED APPLICATIONS

This patent application is the U.S. national stage entry, under 35 U.S.C. § 371, of International Application No. PCT/SG2018/050416, filed Aug. 16, 2018, which claims priority to U.S. Provisional Patent Application No. 62/557,317 filed Sep. 12, 2017, the entire contents of which are hereby incorporated by reference.

TECHNICAL FIELD

The invention relates to high-volume manufacture of devices, in particular of optical devices such as of micro-optical systems. It relates to wafer-level manufacturing of such devices and to producing related wafer stacks.

Definitions

"Passive optical component": An optical component redirecting light by refraction and/or diffraction and/or (internal and/or external) reflection such as a lens, a prism, a mirror (plane or curved), optical filter, or an optical system, wherein an optical system is a collection of such optical components possibly also comprising mechanical elements such as aperture stops, image screens, holders.

"Replication": A technique by means of which a given structure or a negative thereof is reproduced. E.g., etching, embossing (imprinting), casting, molding.

"Wafer": A substantially disk- or plate-like shaped item, its extension in one direction (z-direction or vertical direction or stacking direction) is small with respect to its extension in the other two directions (x- and y-directions or lateral directions). Usually, on a (non-blank) wafer, a plurality of like structures or items are arranged or provided therein, typically on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may prevailingly be made of, e.g., a semiconductor material, a polymer material, a composite material comprising metals and polymers or polymers and glass materials. In particular, hardenable materials such as thermally or UV-curable polymers are interesting wafer materials in conjunction with the presented invention.

"Lateral": cf. "Wafer"

"Vertical": cf. "Wafer"

"Light": Most generally electromagnetic radiation; more particularly electromagnetic radiation of the infrared, visible or ultraviolet portion of the electromagnetic spectrum.

BACKGROUND OF THE INVENTION

In the manufacture of optical devices such as of opticals systems, and especially in manufacturing on wafer-level, an alignment of constituents of the devices along lateral directions is critical, and also a vertical distancing of such constituents is of high importance. In order to accomplish a high accuracy in vertical distancing such constituents and thus, in distancing respective wafers, spacers are known in the art. E.g., a spacer wafer of an appropriate height is sandwiched between two wafers comprising the respective constituents, e.g., optical components, in order to ensure a defined distance between these.

For bonding wafers to each other, so as to form a wafer stack, it is known to apply a bonding material such as an adhesive between adjacent wafers.

SUMMARY OF THE INVENTION

Even though excellent results are achieved using the spacer technique described above, the inventors noticed that it could be desirable to have a better control of an applied bonding material.

In a first aspect, the inventors developed a way to gain an improved control of a thickness of a bonding material, especially of a bonding material applied between wafers. This can be worthwhile, even though such a thickness tends to be very small compared to a height of a spacer; and despite any related desire having been expressed in the art so far (to the inventors' knowledge).

In a second aspect, the inventors found a solution for another potential problem which apparently was neither recognized in the art yet. It can be useful to take measures to steer (in the sense of "control") the spreading of the bondung material. This can make possible, e.g., to ensure that the bonding material does not cover surfaces which should remain free from bonding material, or to produce particularly small devices, such as devices which have very small lateral dimensions, i.e. which have a very small footprint.

An example of an advantage of a version of the invention is that it provides a new way of manufacturing wafer stacks.

Another example of an advantage of a version of the invention is that it makes possible a high-precision distancing of wafers and of devices or components, respectively.

Another example of an advantage of a version of the invention is that it provides devices comprising two mutually attached members, wherein the members are mutually distanced with very a high precision.

Another example of an advantage of a version of the invention is that it provides devices comprising two mutually attached members, wherein the members are distanced with very a high accuracy.

Another example of an advantage of a version of the invention is to make possible to design devices which have a particularly small footprint.

Another example of an advantage of a version of the invention is to provide ways of controlling bonding material between constituents of devices.

Another example of an advantage of a version of the invention is to provide control (or an improved control) over a spreading of bonding material between wafers to be bonded to each other and between members of a device, respectively.

Further examples of advantages of versions of the invention correspond to advantages listed above or below, specifically relating to optical devices such as to optical systems, e.g., to micro-optical devices such as to micro-optical systems. E.g., another example of an advantage of a version of the invention is to provide a new way of manufacturing optical devices.

Further objects and various advantages emerge from the description and embodiments below.

At least one of these objects and advantages can be achieved in some implementations of apparatuses and/or methods described in this disclosure.

The inventors contrived a distancing element (and, in instances, a distancing portion, respectively) which makes possible to define (such as to determine) a thickness of a layer of bonding material used for attaching two members to each other, such as during attaching two wafers to each other by means of the bonding material. This can make possible to achieve very precise distancing, in particular vertical distancing, between the members and the wafers, respectively.

And furthermore, the inventors contrived ways to steer a spreading of bonding material applied between members of a device and applied between wafers to be bonded to each other, respectively. Making use of capillary forces and suitably designing the members and wafers, respectively, with respect to material properties and shapes can make possible, e.g., to avoid a spreading of the bonding materials into regions or onto surfaces where the presence of the bonding material is undesired. E.g., functional portions of members of the device which shall not be exposed to the bonding material can be kept free from the bonding material.

For example, the method for producing a wafer stack can include
- providing a first wafer comprising a plurality of first members, wherein each of the first members includes a first distancing element;
- providing a second wafer comprising a plurality of second members;
- aligning the first and the second wafer with respect to each other to establish a plurality of pairs of mutually aligned associated first and second members;
- providing each of the pairs with a portion of a bonding material by applying a portion of the bonding material to one or to both of the first and the second members of each of the pairs;
- moving the first wafer and the second wafer towards each other, until each of the first distancing elements abuts the associated second member;
- effecting, by the moving, that for each of the pairs, the respective portion of bonding material forms a layer of bonding material interconnecting the respective first and second members, wherein a thickness of the layers is defined by the first distancing element.

This may make it possible to achieve very well defined thicknesses of the bonding material. And consequently, it can make possible to produce devices comprising a first and a second member which are vertically stacked upon each other in such a way that a vertical distance between spaced-apart parts of the members is very well defined.

This can be valuable, e.g., if the devices include portions, e.g., central portions, which establish optical surfaces (such as lens surfaces) facing each other, because distances between such optical surfaces have to be very close to (predetermined) desired values in order for the device to be able to fulfill its function.

The aligning can be a lateral aligning. For a device obtainable from the wafer stack to be usable, it is in many cases important that a precise lateral alignment is achieved. This can be the case, e.g., when the members include optical elements such as passive optical components, e.g., refractive optical elements.

The term "lateral" refers to directions perpendicular to a vertical direction.

The moving can have a vertical component. E.g., the moving can be accomplished by a (relative) movement along a vertical direction which is defined by the wafers.

An effect of the moving can be that an area in which the bonding material covers the first member is increased, and an area in which the bonding material covers the second member is increased. The can moving can effect that the respective portion of bonding material spreads on the first member and on the second member, e.g., after the bonding material has come into contact with both associated members of a pair.

The bonding material can be an adhesive.

In some embodiments, the bonding material is a hardenable material such as a curable material. It can be, e.g., a curable epoxy resin.

For example, during applying the portions of bonding material, the bonding material can be liquid. And the bonding material can be hardened, e.g., cured, later on, such as after the forming of the layer and before a separation step in which the wafer stack is divided.

In some embodiments, the applying of the portion of the bonding material is accomplished using a dispenser.

In some embodiments, the applying of the portion of the bonding material is accomplished in a screen printing process.

Both, dispensing the portions of bonding material by means of a dispenser, and applying the bonding material using screen printing technology, can be accomplished with high precision and accuracy with respect to an mount of bonding material provided per pair of members and with respect to a location where the bonding material is deposited. And both ways are suitable for high-volume production.

A zone in which a first distancing element abuts the associated second member can be referred to as first contact zone.

The abutting can include that the first distancing element and the second member are brought into mechanical contact. E.g., a contacting surface of the first distancing element which can be flat, is brought in contact with the second member in the first contact zone.

For example, in instances, no portion of the bonding material or only a thin film of the bonding material is present between the distancing element and the second member, or more particularly between the contacting surface of the distancing element and the first member. In instances, said film is thinner than an average thickness of the layer outside the spread control zones (which are described below) by a factor of at least 10, e.g., of at least 20; or it can be thinner than an average height of the gap outside the spread control zones by a factor of at least 10, e.g., of at least 20.

In some embodiments, a thickness of said films at different distancing elements can be identical within manufacturing tolerances.

In some embodiments, the first members are congeneric members.

In some embodiments, the second members are congeneric members.

For example, from the wafer stack, congeneric devices can be produced comprising one of the first members and an associated one of the second members each.

In a specific view, the invention can relate to a method for manufacturing devices which includes producing a wafer stack as herein described.

In another specific view, the invention can relate to devices comprising a first member and a second member which are stacked upon each other. Such devices can be devices obtainable from the described wafer stacks. And the devices can be devices obtainable by the described method for manufacturing devices.

Further possible details regarding the method for manufacturing devices and regarding the devices are described further below.

Of course, the invention relates to devices with corresponding features of described methods and to methods for producing a wafer stack with corresponding features of described devices and to methods for manufacturing devices with corresponding features of described devices. And vice versa, it also relates to methods for manufacturing devices with corresponding features of described methods for producing a wafer stack as well as to methods for producing a wafer stack with corresponding features of described methods for manufacturing devices.

Thus, for reasons of brevity, various features and embodiments are described only once (or only twice), possibly with focus on only the devices or on only one of the method types, even though they can apply to the method for producing a wafer stack as well as to the method for manufacturing devices and to the devices, or to two of these.

The method can include steering a spreading of the bonding material occurring in reaction to the moving. The steering can be accomplished by aid of capillary forces, more specifically by capillary forces acting on the bonding material in contact with the first and second members.

The steering can be accomplished by the aid of the capillary forces in combination with a design of the first and second members.

The design can relate to material properties of the first and second members, such as to their surface tensions, and it can relate to shapes of the first and second members, and it can relate to both. E.g., the shapes can be designed in dependence of material properties of the first and second members and of the bonding material.

The steering can includes confining the spreading of the bonding material to a predetermined region.

In some embodiments, the first and second members include a central portion each.

For example, the spreading of the bonding material can be confined to prevent a spreading of the bonding material onto one of the central portions. Or, the spreading of the bonding material can be confined to prevent a spreading of the bonding material onto a surface of the central portion of the first member and onto a surface of the central portion of the second member.

In some embodiments, the first and second members include surfaces which are designed (again, with respect to shape and/or material properties) to establish a capillary pressure acting on the bonding material which is inwardly decreasing and outwardly decreasing. The terms "inwardly" and "outwardly" refer to, e.g., the central portions of the members. Thus, e.g., "inwardly" means in a direction pointing away from the central portions, and "outwardly" means in a direction pointing towards the central portions.

Similarly, after the moving the first wafer and the second wafer towards each other, until each of the first distancing elements abuts the associated second member, each pair of members can have a central axis, and the terms "inwardly" and "outwardly" can analogously refer to said central axis and more specifically to radial directions. This central axis can coincide with a central axis of a device to be obtained from the wafer stack.

With reference to the central axis, "outwardly" can be referred to as "radially outwardly" and "inwardly" can be referred to as "radially inwardly"; wherein this shall not imply that the devices are necessarily rotationally symmetric or that the central portions are necessarily rotationally symmetric.

The inwardly and outwardly decreasing capillary pressure (acting on the bonding material) can force bonding material, e.g., to remain in a region which neither exceeds a predetermined maximum distance (from the central axis or from the central portions) nor goes below a predetermined minimal distance (to the central axis or the central portions).

In some embodiments, the method includes, for each of the pairs, establishing a capillary pressure acting on the respective portion of the bonding material to keep said respective portion of bonding material in a predetermined region. E.g., said predetermined region ends (at an inner end) where the central portions begin and ends (at an outer end) in a volume buffer zone (which can coincide with an outer spread control zone, cf. below).

By a suitable design, it is possible to ensure that the central portions remain free from the bonding material, while excess bonding material spreads into the volume buffer zone. This can contribute to a stable mass production process with little rejects, despite an unavoidable presence in practice of variations in the amount of bonding material applied per pair of members, i.e. in the amount of bonding material in the applied portions of bonding material.

After the moving the first wafer and the second wafer towards each other until each of the first distancing elements abuts the associated second member, in a gap zone, a gap is established between the respective first and second members of the respective pair. For each pair, the gap zone is peripheral to the central portions, and a portion of the gap is filled by the respective portion of the bonding material, so as to establish a bonding between the respective first and second members. A zone in which the bonding takes place is referred to as bonding zone. The bonding zone can thus be included in the gap zone. The bonding zone can be, e.g., the zone in which the first and second members are bonded to each other by the bonding material.

By the first distancing element, a height of the respective gap can be defined—with high precision.

It seems unnecessary to define the height of the gap in terms of micrometers. However, if it would be necessary to numeralize the height of the gap, one could define it as an average height of the gap outside the spread control zones (cf. below).

Likewise, it seems unnecessary to define the thickness of the layer of bonding material in terms of micrometers. However, if it would be necessary to numeralize the thickness of the layer of bonding material, one could define it as an average thickness of the bonding material outside the spread control zones.

Such a height of the gap and, likewise, such a thickness of the layer of bonding material can, in instances amount to less than 0.2 mm and, more particularly, to less than 0.1 mm, and even to less than 0.05 mm. E.g., they can be between 0.002 mm and 0.1 mm.

In some embodiments, for each of the pairs, a height of the respective gap is inwardly and outwardly increasing. Similarly:

In some embodiments, for each of the pairs, the gap opens up inwardly and outwardly.

Such embodiments can effect desired capillary pressures and can make possible to limit the spreading of the bonding material in a desired way, such as to confine the bonding material to a predetermined region.

In the following, an indication that recited features or properties are meant to apply not only for at least one pair, but for each pair (and for each device to be manufactured, respectively), is occasionally omitted for reasons of clarity.

In some embodiments, the gap zone includes an inner spread control zone and an outer spread control zone. The inner spread control zone is located between the central portions and the outer spread control zone. For example, in the inner spread control zone, the gap opens up along a direction pointing away from the outer spread control zone (such as along a direction pointing towards the central portions), and in the outer spread control zone, the gap opens up along a direction pointing away from the inner spread control zone (such as along a direction pointing away from the central portions).

In some embodiments, an outer end of the bonding zone is located in the outer spread control zone, and an inner end of the bonding zone (which is located between the central portions and the outer end of the bonding zone) is located in the inner spread control zone.

In some embodiments, the gap zone adjoins the central portion.

In some embodiments, the gap zone laterally surround the central portion, such as, e.g., it can completely laterally surround the central portions.

In some embodiments, the inner spread control zone laterally surround the central portions, such as, e.g., it can completely laterally surround the central portion.

In some embodiments, the outer spread control zone laterally surround the central portions, such as, e.g., it can completely laterally surround the central portion.

In some embodiments, an outer opening angle and, in instances, also an inner opening angle of the gap is smaller than 90°, e.g., smaller than 80°.

In some embodiments, in the bonding zone, an outer opening angle and, in instances, also an inner opening angle of the gap is smaller than 90°, e.g., smaller than 80°.

In some embodiments, in the inner spread control zone, an opening angle of the gap is smaller than 90°, e.g., smaller than 80°.

In some embodiments, in the outer spread control zone, an opening angle of the gap is smaller than 90°, e.g., smaller than 80°.

When said opening angles are not too large, the spreading of the bonding material can be controlled in a rather stable way. E.g., the opening angles can be below 70°. The opening angle in the outer spread control zone can in instances amount to below 50° and more particularly to below 35°.

Such an opening angle of the gap can be defined, e.g., as an angle in a cross-section through the pair, in a vertical plane, wherein the vertical plane passes through the central axis and/or through the central portions, and it passes through the gap zone. In the cross-section, mutually opposing surfaces in the gap zone of the first and second members are reduced to first and second lines, respectively. The angle can be defined as an angle between a (local) tangent to the first line on the one hand and a (local) tangent to the second line on the other hand.

In some embodiments, in the inner spread control zone, the gap opens up more rapidly than in the outer spread control zone. Similarly:

In some embodiments, the gap opens up inwardly more rapidly than it opens up outwardly. Similarly:

In some embodiments, the opening angle of the gap in the inner spread control zone is larger than the opening angle of the gap in the outer spread control zone.

In some embodiments, in the outer spread control zone, a minimal distance between the first member and the second member increases along a direction outwardly from the central portions (or from the central axis) more strongly than in the inner spread control zone a minimal distance between the first member and the second member increases along a direction inwardly towards the central portion increases in the inner spread control zone.

In such embodiments, excess bonding material can be predominantly received in the outer spread control zone, whereas only relatively small amounts of excess bonding material only are received in the inner spread control zone. The outer spread control zone can thus function as a volume buffer zone. An spreading of bonding material onto surfaces of the central portions can be avoided, at least up to relatively high amounts of excessive bonding material. Thus, a protection of the central portions from the bonding material can be achieved.

The above measures can prevent bonding material from entering a central volume present between the central portions of the first and second members. The central volume can be a volume between mutually facing surfaces of the first and second members and thus, e.g., between mutually facing optical surfaces, such as lens surfaces, of the first and second members.

It can thus be avoided that a function to be fullfilled by the central portion is impaired by the bonding material.

Accordingly, it can, at least in instances, be of advantage, to prevent that a space between the central portion of the first member and the central portion of the second member (the central volume) is (fully or partially) filled with the bonding material.

Thus, measures are herein described to prevent that bonding material is pulled into a volume (the central volume) between the central portions by capillary forces, or—if applicable—in addition, by pressing forces pressing towards each other the first and second wafers.

In some embodiments, the layer of bonding material laterally surrounds the central portions. This can provide stability of the mutual bonding of the members.

In some embodiments, the layer of bonding material completely laterally surrounds the central portions. This way, the layer of bonding material can function as a seal. Inner surfaces of the first and second members can be sealed from the outside this way.

In some embodiments, the bonding material forms a sealing ring, wherein the sealing ring and the first and second members completely seclude a central volume present between the central portions. E.g., along the sealing ring in full, the bonding material can be in contact with both, the first and the second members.

Such embodiments provide good protection for the central portions and in particular for their surfaces. E.g., fluids or particles to which the wafer stack (or later on, the device) is exposed are kept from entering the central volume. For example, in a decing process to which the wafer stack may be subjected at some point, cooling water may be used and particles and related debris is likely to be present—but they can be kept from entering the space between the inner portions by the bonding material forming a sealing ring and completely laterally surrounding the central portion, respectively.

In some embodiments, the method includes manufacturing the first wafer, wherein the manufacturing of the first wafer includes producing the first members on a first substrate using a replication process. The replication process can be, e.g., an embossing process. In the replication process, the first members are formed from a replication material.

In some embodiments, the method includes manufacturing the second wafer, wherein the manufacturing of the second wafer includes producing the second members on a second substrate using a replication process. The replication process can be, e.g., an embossing process. In the replication process, the second members are formed from a replication material.

Such processes are excellently suited for mass production of high-precision parts, such as of optical devices.

The details described for the manufacture of the first wafer can apply, too, to the second wafer, in particular if the second wafer includes a distancing element (second distancing element) having features and functions corresponding to features and functions, respectively, of the first distancing elements. For reasons of brevity, a repetition of all the possible features is dispensed with here.

The first substrate can be, e.g., a dimensionally stable substrate. It can be a planar plate-shaped substrate. The substrate can be, e.g., made of a glass. It can be a glass plate.

In some embodiments, the first distancing elements are produced in one and the same process together with the respective central portion. That process can be, e.g., a replication process, such as an embossing process.

In some embodiments, the first distancing elements are made of the same material as the respective central portions, and both belong to one and the same single-piece part (unitary part; integrally formed part).

In some embodiments, each first distancing element is included in the respective first member, and the first member is a unitary (integrally formed) part.

Having the distancing element(s) integrally formed with the respective central portion(s) can provide an excellent accuracy and precision of their mutual lateral positioning; and, in instances more importantly, an excellent accuracy and precision of a height and of a vertical positioning of the distancing elements relative to the central portions is achievable.

In some embodiments, the method includes using a replication tool in the embossing process in which the first members are produced on the first substrate, wherein the replication tool includes for each of the first members a region for shaping the respective distancing element.

Accordingly, for each first member (and thus also for each pair of first and second members), the respective first distancing element and the remainder of the respective first member are made of one and the same piece of replication material and thus constitute a single-piece part.

When the first distancing elements are unitary with the remainder of the respective first members, they can also be referred to as distancing portions.

In some embodiments, the replication tool includes for each of the first members a first replication site for shaping the respective central portion from a replication material and, surrounding the first replication site, a flow control site for controlling a flow of the replication material (during the manufacture of the respective first member). And the region for shaping the respective distancing element is located between (more specifically located laterally between) the first replication site and the flow control site.

In some embodiments, the first distancing elements of the first wafer all have identical dimensions. All produced devices can have identical first distancing elements. They can all have, e.g., an identical predetermined height. By the height, a height of the gaps and a thickness of the layers of bonding material can be defined—which can be identical for all devices obtained from the wafer stack (and for all pairs of first and second members of the wafer stack, respectively).

In some embodiments, each of the first distancing elements is arranged outside the central portion of the respective first member.

In some embodiments, for each of the pairs, the respective first distancing elements is arranged laterally between the central portion of the respective first member and the respective outer spread control zone.

In some embodiments, each of the layers of the bonding material forms at its peripheral end (such as at its peripheral circumference) a meniscus.

In some embodiments, for each of the pairs, the respective first distancing element is arranged between the respective meniscus and the respective first central portion.

In some embodiments, for each pair, the bonding zone is periperhally (laterally) delimited by meniscuses formed by the bonding material, more particularly wherein the meniscuses are located in the inner and outer spread control zones, respectively.

The first distancing elements can be adjacent to the layer of bonding material.

In some embodiments, the first distancing elements are laterally completely surrounded by the layer of bonding material.

In some embodiments, every laterally peripheral point of the first contact zone adjoins the bonding zone.

In some embodiments, the bonding material is completely (laterally) flown around the first distancing elements. E.g., the first distancing element can sideways interface the bonding material along its complete perimeter.

If the first distancing elements are circumferentially abutting the bonding material, e.g., devices with a particularly small footprint can be made, while providing a relatively good stability of the bonding.

In some embodiments, the method includes hardening the bonding material. The hardening can be, e.g., a curing. It can be accomplished by one or both of applying heat and irradiating with light, such as with UV light.

In some embodiments, the method includes applying a pressing force to press the first wafer against the second wafer, such as to press the first distancing elements against the second members. The pressing forces can be, e.g., forces in excess to gravitational forces. By the pressing, the number of first distancing elements getting into contact with the second member (with no bonding material in between or with only a negligible amount of bonding material therebetween) can be increased. This can, accordingly, increase precision of the vertical distancing and reduce the number of rejects.

The pressing can be applied, e.g., at least during a beginning of the hardening of the bonding material.

In some embodiments, the second member in the first contact zone describes a contact surface which is planar. More particularly, the contact surface can furthermore be vertically aligned. This can contribute to achieving a well-defined gap height.

In some embodiments, in addition, a surface of the second member adjacent to the contact surface is planar, more specifically is coplanar with the contact surface. Also this can contribute to achieving a well-defined gap height; and it can contribute to achieving a good process stability (increased robustness against lateral alignment errors).

In some embodiments, for each of the pairs, it applies to one or both of the respective first and second members that the respective member exhibits a planar surface in the gap zone.

This can simplify an application of the bonding material, namely when the bonding material is applied, at least in part, to said planar surface.

Furthermore, this can contribute to process stability, namely if one of the distancing elements of the pair is to abut the respective member in said planar surface. Small deviations in the lateral alignment of the wafers will not lead to strong deviations in the thickness of the layer of bonding material or, viewed from a different point of view, will not lead to strong deviations in the height of the gap.

In some embodiments, the planar surface is aligned perpendicularly to the vertical direction.

In some embodiments, the planar surface makes up more than 50%, in particular more than 70% of the lateral extension of the bonding zone.

In some embodiments, the planar surface is (inwardly) delimited at an inner end where the gap zone abuts the inner spread control zone and is (outwardly) delimited at an outer end where the gap zone abuts the outer spread control zone. This way, the planar surface can be particularly large. This can simplify application of bonding material to the respective member, in particular if screen printing is used therefor, but also if dispensing is used. The bonding material can be applied onto the planar surface.

In some embodiments, the planar surface is included in the second member. And furthermore, it can be provided that all distancing elements abutting the respective other member are included in, e.g., are integrally formed with, the first member. Thus, the second member can be free of distancing elements.

In some embodiments, the second member forms an inner edge where the gap zone adjoins the central portion and an outer edge peripheral to the inner edge, wherein a surface of said member delimited by said inner edge and said outer edge is planar. This way, a particularly large planar surface can be realized. As indicated above, the planar surface can lie within a plane which is perpendicular to the vertical direction.

In some embodiments, it applies to all of the pairs that all items determining a vertical distance between the central portions of the respective first and second members (such as the first distancing element) are integrally formed with one of the members. In other words, there is no separate additional spacer defining said vertical distance.

In some embodiments, each of the pairs includes at least one additional distancing element. The distancing elements of a pair can all be included all in the first member. However, in other embodiments, the distancing elements of each pair are distributed over both, the respective first and second members. E.g., both members include one distancing element each. Or both members include two distancing element each.

All distancing elements can have features and functions corresponding to features and functions, respectively, described for the first distancing elements. E.g., each of the distancing elements can be integrally formed with the respective member in which it is included. In accordance therewith, the distancing elements can be distancing portions of the respective members. And each of the distancing elements can be abutting the respective other member (in which it is not included).

In some embodiments, each first member includes N1 distancing elements and each second member includes N2 distancing elements, wherein N1 is an integer of at least 1, and N2 is zero or an integer of at least 1.

In some embodiments, N1 is equal N2.

In some embodiments, N2 is 0.

In some embodiments, N1+N2 is 2. And in addition, N2 can be 0.

In some embodiments, N1+N2 is 3. And in addition, N2 can be 0.

In some embodiments, N1+N2 is 4. And in addition, N2 can be 0.

In some embodiments, each of the distancing elements is a protrusion of the respective member in which it is included. In accordance therewith, the first distancing element can be a protrusion of the first member.

The protrusions can protrude vertically from the respective member.

In some embodiments, each of the distancing elements of a pair (or of those of a device) is a stub. In particular, the first distancing element can be a stub.

Each of the distancing elements (and in particular the first distancing element) can have a contacting surface which may be flat, abutting the respective other member; e.g., the contacting surface of the first distancing element abuts the second member.

Each of the distancing elements of a pair (or of a device) can abut the respective other member in a respective contact zone. E.g. the first distancing element can abut the second member in the first contact zone.

In some embodiments, each pair (and each device, respectively) includes four distancing elements, in particular no more than exactly four distancing elements, and they can be all included in the first member. All these can be abutting the second member.

In some embodiments, a height of the gap (and a thickness of the layer) is, within manufacturing tolerances, defined, in particular equally defined, by all distancing elements of the respective pair and device, respectively.

An increased number of distancing elements per pair can result in a more precisely defined height of the gap and thickness of the layer, respectively. E.g., a parallelism of the first and second wafers locally at the respective pair can be ensured rather well.

However, considering the wafer-level manufacture, a single distancing element, i.e. the first distancing element alone, can be sufficient, because of the presence of the further pairs close-by which can have no more than a single distancing element, too. By the close-by further pairs of members, a very accurate mutually parallel alignment of the first and second wafers can be rather well ensured, even locally for each pair. Accordingly, e.g., one or two distancing elements per pair (or per device) can be sufficient. And less distancing elements can mean more surface area in which the first and second members are bonded to each other by the bonding material; which can be of importance if the pairs and/or the devices shall have a particularly small footprint.

As will have become clear, features described for the first distancing element can—as far as logically possible—also apply to further distancing elements.

In some embodiments, outer bounds of the layer of bonding material describe a rectangular shape. This can in instances effect a stronger bonding between the first and second members, e.g., as compared to round or elliptic shapes, because of the larger bonding area (when comparing shapes fitting into the same rectangle, as obtainable by common dicing processes). Accordingly, a smaller footprint of the pairs and/or of the devices can be achievable (at comparable bonding strengths). And a better use of the wafers can be achieved, in terms of the number of pairs (or devices) per area of the wafers (at comparable bonding strengths).

The rectangular shape, in instances, can also effect that the devices obtained from the pairs (after dicing) have compact side walls, thus making the devices more robust than devices which would have slits in edges of sidewalls because bonding material would be lacking there.

The rectangular shape can have rounded corners. This can result in an improved spread control of the bonding material and thus in a higher yield and/or in a simpler design, especially of the outer spread control zone.

The rectangular shape can be, e.g., a square shape.

In some embodiments, the outer spread control zone describes, in a lateral cross-section, a rectangle. This can effect that the layer of bonding material assumes a rectangular shape, with the described effects. The rectangle can have rounded corners. And the rectangle can be a square.

We also describe a method for manufacturing devices, wherein this method includes producing a wafer stack according to a method as herein described.

Furthermore, the method can include separating the wafer stack into parts.

In instances, each part is identical with one of the devices.
In instances, each part is included in one of the devices.
In instances, each part includes one of the devices.

Each part can include the central portions of two associated first and second members.

Each of the devices can include a first member and a second member which are stacked upon each other or at least a portion thereof.

They can be stacked upon each other in a direction referred to as vertical direction (as has been described herein before).

The separating can be accomplished, e.g., using a wafer saw (or dicing saw) or using a laser (laser cutting).

In some embodiments, the method includes, prior to the separating, filling a filler material into an interstitial volume present between neighboring ones of the pairs of mutually aligned associated first and second members.

This can contribute to stabilizing the wafer stack before separation. And the separation step can in instances be simplified, e.g., problems related to fractions of the wafer stack which would become loose during the separation step can be mitigated.

The filler material can be, e.g., a hardenable material, e.g., a curable material.

For example, during the filling, the filler material can be in an initial state in which it is liquid. And afterwards, the filler material is hardened, e.g., cured. The filler material can be, e.g., an epoxy resin.

The filling can be accomplished, e.g., using vacuum injection. This way, formation of voids can be much reduced, thus ensuring a complete or nearly complete filling of the interstitial volume.

In general, and in particular in conjunction with the filling, especially if vacuum injection is applied, it can be of advantage to have the central volume sealed, such as in the ways described above.

We also describe devices according to the invention. They may be, e.g., devices manufactured according to methods as herein described.

Alternatively or in addition, the device can be a device comprising a first member and a second member which are stacked upon each other in a direction referred to as vertical direction, the first and second members comprising a central portion each, the first member comprising at least a first distancing element abutting the second member, the device comprising a gap zone and a bonding material, wherein the gap zone is peripheral to the central portions, and in the gap zone, a gap is present between the first and second members, and a portion of the gap is filled by the bonding material bonding the first and second members to each other in a bonding zone included in the gap zone, wherein a height of the gap is defined by the first distancing element.

The device can be an optical device, e.g., an optical system.

The device can be, e.g., a micro-optical device, e.g., a micro-optical system.

The central portions can be functional portions.

They may, e.g., include an optical element and/or optical surface each.

The central portions can e.g., include a passive optical component each, such as a lens.

The lenses can be diffractive lenses or refractive lenses or combined diffractive-and-refractive lenses.

In some embodiments, one of the central portions has a convexly shaped surface and the other of the central portions has a concavely shaped surface. These surfaces can face each other.

For example, the first central portion has the convexly shaped surface and the second central portion has the concavely shaped surface. This can, in instances, simplify the application of the bonding material on the second member.

In some embodiments, the convexly shaped surface can extend into a space surrounded by the concavely shaped surface.

In some embodiments, the bonding material is a hardenable material in its hardened state, such as a cured curable material. It can be, e.g., a curable epoxy resin.

In some embodiments, one of the central portions includes a convex lens and the other of the central portions includes a concave lens. For example, the first central portion includes the convex lens and the second central portion includes the concave lens.

In some embodiments, the convex lens extends into the concave lens, more specifically, e.g., into a space surrounded by a concave lens surface of the concave lens.

In some embodiments, the device is laterally smaller than 8 mm, e.g., smaller than 4 mm. It can even be smaller than 2 mm. It can be, e.g., between 0.4 mm and 1.5 mm.

In some embodiments, the device is vertically smaller than 8 mm, e.g., smaller than 4 mm. It can even be smaller than 2 mm. It can be, e.g., between 0.4 mm and 1.5 mm.

In some embodiments, the central portions are laterally smaller than 3 mm, e.g., smaller than 2 mm. They can even be smaller than 1 mm each. They can be, e.g., between 0.2 mm and 1.0 mm.

In some embodiments, the central portions are vertically smaller than 2 mm, e.g., smaller than 1 mm. They can even be smaller than 0.5 mm each.

In some embodiments, the central portions are vertically distanced from each other.

In some embodiments, the central portions are laterally aligned with respect to each other. E.g., they share the central axis, e.g., have the same optical axis.

When the first distancing element defines a height of the gap, it can define a thickness of the layer of bonding material in the gap zone (more particularly in the bonding zone).

In some embodiments, the gap widens inwardly towards the central portions. More specifically, the gap widens in the inner spread control zone (included in the gap zone).

In some embodiments, the device includes one or more further distancing elements.

E.g. the device can include four distancing elements, e.g., no more than exactly four distancing elements. These can be included, e.g., all in the first member, e.g., being integrally formed therewith.

In some embodiments, the first distancing element is completely (laterally) circumferentially in contact with the bonding material.

In some embodiments, the bonding material forms a meniscus at an inner end of the bonding zone.

In some embodiments, the bonding material forms a meniscus which is located in the inner spread control portion.

The meniscus can surround, in particular completely surround, the central portions (laterally).

In some embodiments, the bonding zone laterally surrounds the central portions.

In some embodiments, the bonding zone completely laterally surrounds the central portions. This can provide the sealing described herein before.

In some embodiments, the first and second members are sandwiched between a first substrate and a second substrate, such as between glass plates.

In some embodiments, the first member includes a first spacer portion, and the second member includes a second spacer portion, wherein the first distancing element protrudes from the first spacer portion. This way, a vertical distance between the first and second spacer portions can be defined by the first distancing element.

The first and second spacer portions can be peripheral to the respective central portions The first and second spacer portions can be integrally formed with the respective central portions.

As indicated above, properties of the device can translate into corresponding properties of the wafer stack or of the methods, even if this is not explicitly said.

However, it is noted that the device can lack one or more of the features or properties of the members and of the pairs, as these may have been removed from the pairs, e.g., by the separating. For example, the outer spread control zones can be removed. And/or the outer meniscuses can be removed.

Further embodiments and advantages emerge from the following description and the enclosed figures and from the dependent claims.

BRIEF DESCRIPTION OF THE DRAWINGS

Below, the invention is described in more detail by means of examples and the included drawings. In the drawings, same reference numerals refer to same or analogous elements. The figures show schematically.

The described embodiments are meant as examples or for clarifying the invention and shall not limit the invention.

DETAILED DESCRIPTION OF THE INVENTION

In the following, FIGS. 1 to 5 are jointly described. They relate to one and the same embodiment but they show different parts or views thereof.

Figure 1:
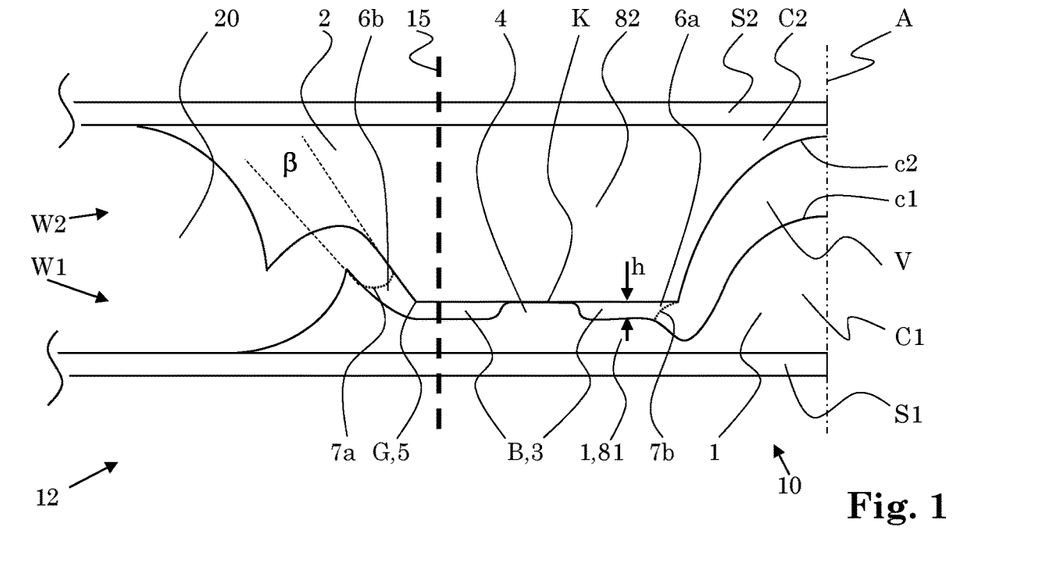
FIG. 1 a vertical cross-section through a detail of a wafer stack and of a device, respectively.

FIG. 1 shows a vertical cross-section through a detail of a wafer stack 12 and of a device 10, respectively. Wafer stack 12 includes two wafers W1, W2 which include a substrate S1 and a substrate S2, respectively, on which a plurality of first members 1 and a plurality of second members 2, respectively, are present. In FIGS. 1 to 5, only a single first member 1 and a single second member 2 are shown, wherein in FIGS. 1 to 3, only a half of the respective members 1, 2 is shown.

Figure 2:
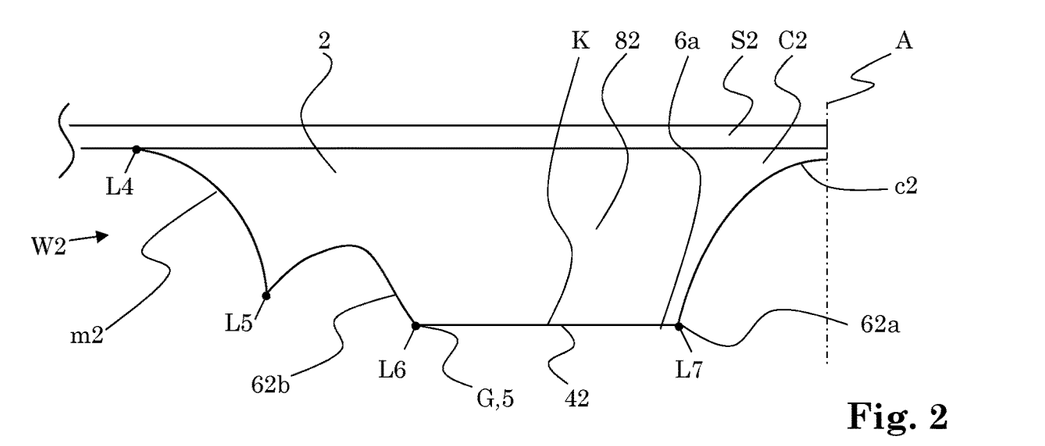
FIG. 2 a vertical cross-section through a detail of a second wafer and of a second member, respectively.
Figure 3:
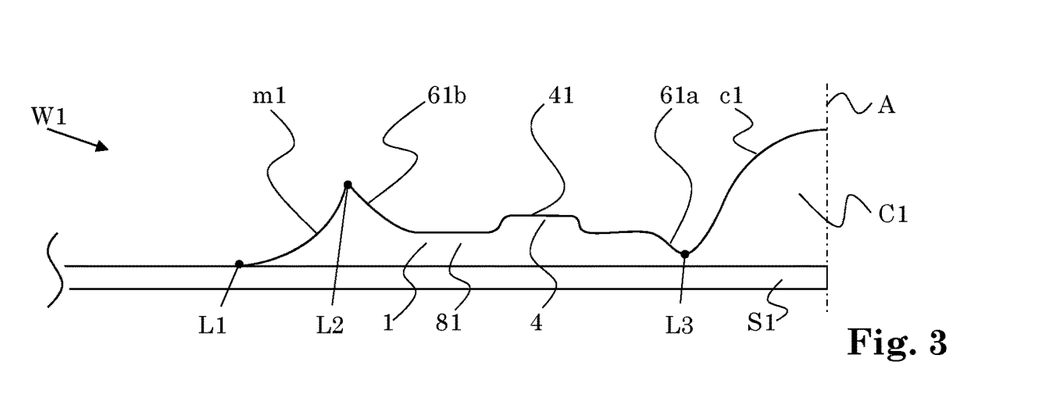
FIG. 3 a vertical cross-section through a detail of a first wafer and of a first member, respectively.

FIG. 2 shows a detail of second wafer W2 and of second member 2, respectively, in the same vertical cross-section as FIG. 1. FIG. 3 shows a detail of first wafer W1 and of first member 1, respectively, in the same vertical cross-section as FIG. 1.

Figure 4:
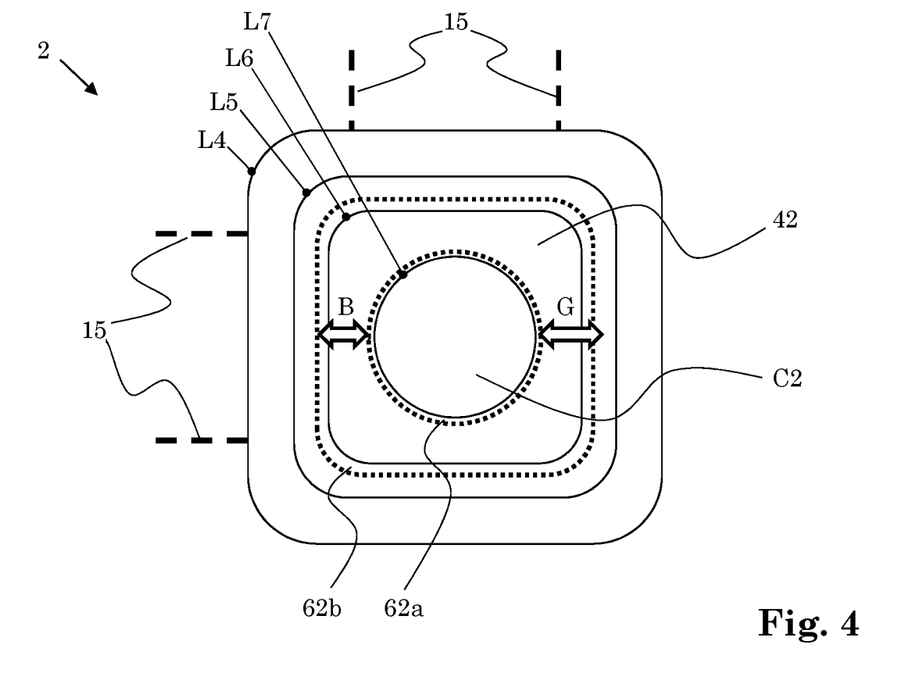
FIG. 4 a projection into a wafer plane of details of a second member.
Figure 5:
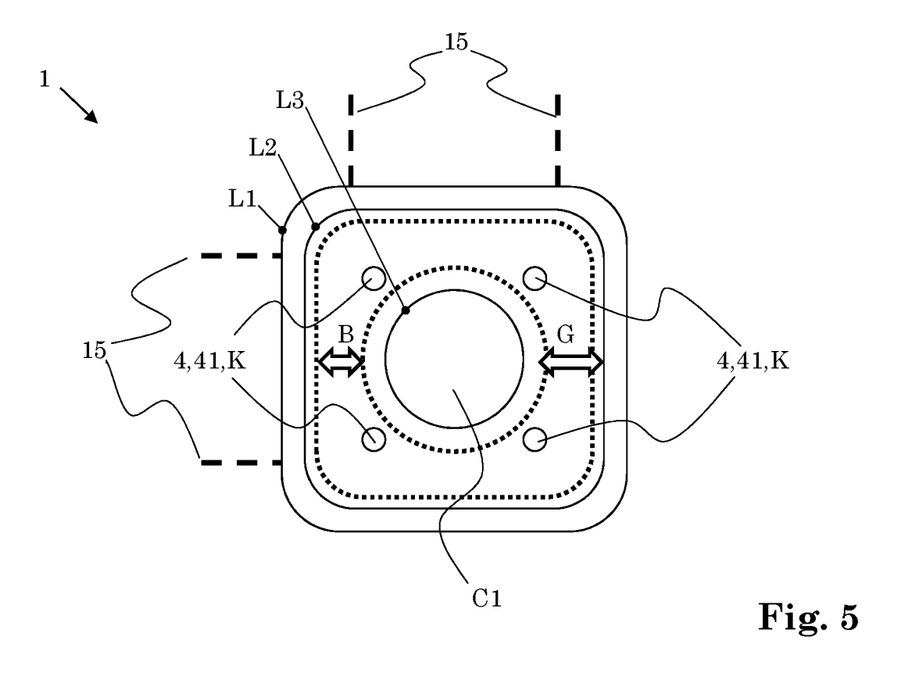
FIG. 5 a projection into a wafer plane of details of a first member.

FIG. 4 shows a projection into a wafer plane of details of second member 2. FIG. 5 shows a projection into a wafer plane of details of first member 1. The cross-sections of FIGS. 1 to 3 are cross-sections along a diagonal in FIGS. 4, 5.

The dash-dotted line in FIGS. 1 to 3 denotes a central axis A of the device which is vertically aligned. Accordingly, axis A is aligned perpendicularly to wafers W1, W2 and to substrates S1, S2. The cross-sections of FIGS. 1 to 3 could be completed to show members 1 and 2 (and the device 10, respectively) in full by mirroring the respective Figure at axis A.

For simplifying understanding the relation between FIGS. 1 to 3 and FIGS. 4, 5, and as a guide to the eye, some common points labelled L1 to L7 have been drawn in the Figures.

Members 1 and 2 are bonded to each other in a bonding zone B by a bonding material forming a layer 3 between members 1 and 2. Layer 3 completely (laterally) surrounds axis A. At its inner end, it forms a meniscus 7a, and at its outer end, it forms a meniscus 7b, both being illustrated by dotted lines in FIG. 1. In FIGS. 4 and 5, the inner and outer ends of layer 3 are illustrated by dotted lines, approximately where the meniscuses 7a and 7b are located.

To obtain a device 10, manufacture can be accomplished as follows. Members 1 and 2 are produced on wafer level using an embossing process in which a liquid replication material sitting on the respective substrate material S1, S2 is shaped by means of a respective replication tool and then hardened, e.g., cured. The respective replication tool has a replication surface having the shape of a negative of the member to be produced, with the exception that excess replication material is forced to accumulate circumferentially, thus contributing to the respective member while forming a meniscus which is not specifically shaped by the replication tool, or, more precisely, the replication surface does not exhibit a shape corresponding to a negative of said meniscus. The meniscuses are denoted m1, m2.

After wafers W1, W2 are produced, they are bonded to each other to obtain wafer stack 12 (FIG. 1). A portion of bonding material 3 is applied to each member 2, and wafers W1, W2 are moved towards each other along the vertical direction until they are abutting one another. The amount of bonding material applied to member 2 can be (within technical limits) equal for all members of wafer W2.

By the respective replication tool, each member 1, 2 is shaped to include a central portion C1 and C2, respectively, which are, in the instant embodiment, a convex lens and a concave lens, respectively, exhibiting lens surfaces c1 and c2, respectively, facing each other (cf. FIG. 1).

A very precisely defined vertical distance between the members 1, 2, and in particular between the respective central portions C1, C2, such as between the lens surfaces c1, c2, can be achieved by means of distancing elements 4. As illustrated, they can be embodied as vertically protruding portions of member 1, integrally formed with the rest of member 1. The replication surface of the replication tool for producing member 1, accordingly, has regions for shaping the respective distancing elements 4.

Accordingly, for each pair, the distancing elements 4 and the central portion C1 of member 1 can be produced (and/or are shaped) in one and the same process, such as in one and the same embossing process.

The distancing elements 4 can have a flat contacting surface 41 each which abut member 2 at optionally planar contact surfaces 42 in a contact zone K.

Between members 1 and 2, a gap 5 is formed in a gap zone G. Gap 5 is partially filled by the bonding material. As is clear from the illustrated embodiment (cf. FIG. 1), the bonding material can flow around each of the distancing elements 4, such that each of the distancing elements 4 sideways interfaces the bonding material along its complete perimeter.

A height h of the gap which corresponds to a thickness of layer 3 is symbolized in FIG. 1 for illustrative purposes. Such a height can be measured, e.g., along a vertical direction, or can be taken as the minimum distance from the first to the second member at a desired point. In embodiments in which the gap has a varying height, the height can be taken, e.g., at any exemplary point in the gap zone, in particular however, outside the spread control zones 6a, 6b (cf. below).

A thickness of layer 3 (or a thickness distribution of layer 3 in case a gap height varies notably between the inner and the outer spread control zones 6a, 6b, cf. below) can be identical for all devices 10. E.g., all distancing elements 4 can all be identically dimensioned. And, e.g., the thickness of layer 3 (and the height of gap 5) can be equal to a distance defined by the distancing elements 4, e.g., equal to a height of the distancing elements 4.

Members 1, 2 can be considered to include spacer portions 81 and 82, respectively. The sum of their respective vertical extensions plus the vertical extension of one of the distancing elements 4 defines a vertical distance between substrates S1 and S2. The distancing elements 4 can abut member 2 at spacer portion 82.

In order to steer the spreading of the bonding material which occurs in reaction to the moving together of the members 1 and 2, spread control zones 6a, 6b are provided. They are included in gap zone G. Inner spread control portions 61a, 62a of members m1 and m2, respectively, are included in inner spread control zone 6a. Outer spread control portions 61b, 62b of members m1 and m2, respectively, are included in outer spread control zone 6b. In the spread control zones, gap 5 widens. Since inner spread control zone 6a is arranged between the central portions and outer spread control zone 6b, gap 5 widens inwardly in inner spread control zone 6a, i.e. in a direction towards central axis A, whereas gap 5 widens outwardly in outer spread control zone 6b, i.e. in a direction pointing away from central axis A.

This way, the bonding material can be forced by capillary forces to remain in gap zone G and in particular to fill gap 5 between the inner and outer spread control zones 6a, 6b.

Gap 5 widens more rapidly in inner spread control zone 6a than in outer spread control zone 6b. This way, excess bonding material predominantly gathers in outer spread control zone 6b; less excessive bonding material gathers in inner spread control zone 6a.

Accordingly, a central volume V between surfaces c1 and c2 can be kept free from bonding material. The widening of gap 5 can also be attributed to an opening angle of the gap in the spread control zones 6a, 6b, e.g., as illustrated at angle $\beta$ in FIG. 1 for outer spread control zone 6b, cf. the thin dashed lines. Opening angle $\beta$ is an angle in a vertical cross-section such as in a vertical cross-section running through the central portions, as is the case for FIG. 1. Opening angle $\beta$ is an angle between local tangents (in the cross-section) to the member surfaces, taken, in FIG. 1, at the outermost points where the bonding material is in contact with the members 1, 2 (i.a. at outer meniscus 7b). Opening angle $\beta$ in FIG. 1 amounts to a couple of degrees only, and it is clearly smaller than an opening angle in inner spread control zone 6a (such as at inner meniscus 7a) which amounts to approximately between 45° and 60°.

It is possible to design members 1, 2 in the gap zone in such a way that, by the capillary forces, the bonding material is forced to leave open a slit interconnecting the inner and outer spread control zones 6a, 6b. This way, a vent hole can be produced.

However, in the illustrated embodiment, layer 3 forms a closed shape completely surrounding the central portions. This can function as a seal ring sealing central volume V.

As illustrated in FIGS. 4, 5, outer spread control zone 6b (and outer spread control portions 61b, 62b) describe, in a cross-section perpendicular to the vertical direction, a rectangle with rounded corners. With respect to a rotationally symmetric design, which would be possible, too, this provides an increased area (in bonding zone B) where the bonding material interconnects members 1 and 2, thus providing an increased stability of devices produced.

Member 2 exhibits, in a vertical cross-section through member 2 running through the central portions C1, C2 and running through gap zone G (such as illustrated in FIGS. 1, 2), an inner edge at L7 and an outer edge at L6 (such as illustrated in FIGS. 1, 2). And a straight line interconnects the inner edge and the outer edge. Optionally, and as illustrated, the straight line can be aligned parallel to a lateral direction. This can make the distancing of the central portions C1, C2 with respect to each other relatively insensitive to lateral misalignments of the wafers W1, W2. And the flatness can facilitate applying the bonding material to member 2.

In order to produce singulated devices, the wafer stack 12 is separated into parts, e.g., along dicing lines 15 like those drawn as thick dashed lines in FIG. 1. In FIGS. 4, 5 only a small section of the straight separating lines 15 is indicated, for the sake of a clearer drawing.

An interstitial volume 20 between neighboring pairs of members 1, 2 in wafer stack 12 can be filled with a filler material such as with a curable material before the separating step. After the filling, the filler material is hardened. This can provide increased stability of wafer stack 12; and it can be prevented (to some amount) that parts loosen from wafer stack 12 during separation—which could interfer with the separating step.

Further details and possible alternatives have been described further above.

The invention claimed is:

1. A device comprising:
    a first member and a second member which are stacked upon each other in a direction referred to as vertical direction, the first and second members each including a central portion, the first member including at least a first distancing element abutting the second member; and a gap zone and a bonding material, wherein the gap zone is peripheral to the central portions, and in the gap zone, a gap is present between the first and second members, and a portion of the gap is filled by the bonding material bonding the first and second members to each other in a bonding zone comprised in the gap zone, wherein a height of the gap is defined by the first distancing element; and wherein the gap zone includes
- an inner spread control portion adjoining the central portions, in which the gap gradually widens towards the central portions, and
- an outer spread control portion adjoining the inner spread control portion, in which the gap gradually widens in a direction away from the central portions wherein the gap opens up inwardly more rapidly than it opens up outwardly.

2. The device according to claim 1, wherein the first distancing element and the central portion of the first member are integrally formed.

3. The device according to claim 1, wherein the first distancing element is completely laterally circumferentially in contact with the bonding material.

4. The device according to claim 1, wherein the bonding material forms a meniscus at an inner end of the bonding zone.

5. The device according to claim 1, wherein the bonding zone laterally completely surrounds the central portions; and optionally wherein the first member comprises, in addition, a second distancing element, a third distancing element and a fourth distancing element, in particular wherein the first distancing element abuts the second member in a first contact zone, second distancing element abuts the second member in a second contact zone, a third distancing element abuts the second member in a third contact zone and a fourth distancing element abuts the second member in a fourth contact zone.

6. The device according to claim 1, wherein the first member is attached to a first substrate, and the second member is attached to a second substrate, wherein the first and second substrates are aligned parallel to each other; and optionally wherein one of the central portions has a convexly shaped surface and the other of the central portions has a concavely shaped surface which face each other; and optionally wherein one of the central portions comprises a convex lens and the other of the central portions comprises a concave lens.

7. A method for producing a wafer stack, comprising
providing a first wafer comprising a plurality of first members, wherein each of the first members comprises a first distancing element;
providing a second wafer comprising a plurality of second members;
aligning the first and the second wafer with respect to each other to establish a plurality of pairs of mutually aligned associated first and second members;
providing each of the pairs with a portion of a bonding material by applying a portion of the bonding material to one or to both of the first and the second members of each of the pairs;
moving the first wafer and the second wafer towards each other, until each of the first distancing elements abuts the associated second member;
effecting, by the moving, that for each of the pairs, the respective portion of bonding material forms a layer of bonding material interconnecting the respective first and second members, wherein a thickness of the layers is defined by the first distancing element; and wherein the first and second members of each of the pairs comprise surfaces which are designed to establish a capillary pressure acting on the respective portion of the bonding material which is gradually inwardly decreasing and gradually outwardly decreasing;

wherein the gap opens up inwardly more rapidly than it opens up outwardly.

8. The method according to claim 7, the first and second members comprising a central portion each, and wherein for each of the pairs, the respective first distancing element and the respective central portion are integrally formed.

9. The method according to claim 7, comprising steering a spreading of the bonding material occurring in reaction to the moving, wherein the steering is accomplished by aid of capillary forces in combination with a design of the first and second members.

10. The method according to claim 7, comprising, for each of the pairs, establishing a capillary pressure acting on the respective portion of the bonding material to keep said respective portion of the bonding material in a predetermined region.

11. The method according to claim 7, wherein by the moving the first wafer and the second wafer towards each other until each of the first distancing elements abuts the associated second member, for each of the pairs, in a gap zone, a gap is established between the respective first and second members, wherein the gap opens up inwardly and outwardly.

12. The method according to claim 7, the first and second members comprising a central portion each, and wherein the layer of bonding material laterally surrounds the central portions; and optionally wherein the first and second members comprise a central portion each, and wherein the layer of bonding material completely laterally surrounds the central portions.

13. The method according to claim 7, wherein the bonding material forms a sealing ring, and wherein the sealing ring and the first and second members completely seclude a central volume present between the central portions.

14. The method according to claim 7, comprising manufacturing the first wafer, wherein the manufacturing of the first wafer comprises producing the first members on a first substrate using an embossing process; and optionally wherein the method comprises using a replication tool in the embossing process which comprises for each of the first members a region for shaping the respective first distancing element; and optionally wherein the replication tool comprises for each of the first members a first replication site for shaping the respective central portion from a replication material and, surrounding the first replication site, a flow control site for controlling a flow of the replication material, and wherein the region for shaping the respective first distancing element is located between the first replication site and the flow control site.

15. The method according to claim 7, wherein for each of the pairs, the respective layer of bonding material forms at its peripheral end a meniscus, and the respective first distancing element is arranged between said meniscus and the respective first central portion; and optionally wherein the method comprises hardening the bonding material.

16. The method according to claim 7, comprising applying a pressing force to press the first wafer against the second wafer; and optionally wherein outer bounds of the layer of bonding material describe a rectangular shape with rounded corners, in particular a square shape with rounded corners.

17. A method for manufacturing devices, each of the devices comprising a first member and a second member which are stacked upon each other, the method comprising producing a wafer stack according to claim 7, the method further comprising separating the wafer stack into parts.

18. The method according to claim 17, comprising, prior to the separating, filling a filler material into an interstitial volume present between neighboring ones of the pairs of mutually aligned associated first and second members.

* * * * *